(12) United States Patent
Tran et al.

(10) Patent No.: US 10,134,158 B2
(45) Date of Patent: Nov. 20, 2018

(54) DIRECTIONAL STAMPING (71) Applicant: Microsoft Technology Licensing, LLC, Redmond, WA (US)

(72) Inventors: Emily Tran, Redmond, WA (US); L. Tucker Hatfield, Kirkland, WA (US); Daniel Parish, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/440,208

(22) Filed: Feb. 23, 2017

(65) Prior Publication Data
US 2018/0240255 A1 Aug. 23, 2018

(51) Int. Cl.
G06T 11/20 (2006.01)
G06T 3/40 (2006.01)
G06F 3/0354 (2013.01)
G06F 17/24 (2006.01)
G06F 3/0488 (2013.01)

(52) U.S. Cl.
CPC ........ *G06T 11/203* (2013.01); *G06F 3/03545* (2013.01); *G06F 3/04883* (2013.01); *G06F 17/242* (2013.01); *G06T 3/40* (2013.01)

(58) Field of Classification Search
CPC .................................................... G06T 11/203
See application file for complete search history.

(56) References Cited

U.S. PATENT DOCUMENTS

| 7,889,186 | B2 | 2/2011 | Nishimura et al. |
| 8,049,755 | B2 | 11/2011 | Kang et al. |
| 8,466,896 | B2 | 6/2013 | Stephanick et al. |
| 8,493,333 | B2 | 7/2013 | Kang et al. |
| 9,007,302 | B1 | 4/2015 | Bandt-Horn |
| 9,201,520 | B2 | 12/2015 | Benko et al. |
| 9,286,703 | B2 | 3/2016 | Brumer et al. |
| 9,310,896 | B2 | 4/2016 | Ji et al. |
| 9,508,166 | B2 | 11/2016 | Bonacina et al. |
| 2002/0148655 | A1 | 10/2002 | Cho et al. |
| 2006/0018561 | A1* | 1/2006 | Napper .............. G06K 9/00409 382/291 |
| 2012/0050293 | A1 | 3/2012 | Carlhian et al. |
| 2015/0097786 | A1 | 4/2015 | Behles et al. |
| 2016/0224239 | A1* | 8/2016 | Angelov .............. G06Q 10/101 |

FOREIGN PATENT DOCUMENTS

WO   WO-2015/075933 A1 *  5/2015

OTHER PUBLICATIONS

Hinckley, et al., "Motion and Context Sensing Techniques for Pen Computing", In Proceedings of Graphics Interface, May 2013, 8 pages.
"Creating a Scalable Ink Picture Control for Tablet PC", https://msdn.microsoft.com/en-us/library/aa480677.aspx, Published on: Mar. 2006, 23 pages.

* cited by examiner

*Primary Examiner* — Jeffery A Brier (57) ABSTRACT

Systems, methods, and software are disclosed herein for supporting directional stamping. In an implementation, an input stroke is received on a canvas in a user interface to an application. The application identifies at least a directional effect with which to render each of a set of discontinuous objects along a continuous path taken by the input stroke on the canvas. The application then renders the set of discontinuous objects on the canvas along the continuous path with at least the directional effect identified for each discontinuous object.

20 Claims, 12 Drawing Sheets

DIRECTIONAL STAMPING

TECHNICAL BACKGROUND

Digital inking has become a popular feature in many software applications. In many instances, a canvas is provided in a user interface to an application through which a user may supply inking input by away of a stylus, mouse, or touch gestures. The inking capabilities provide the user with an easy and natural way to interact with the application.

One particular feature of some applications allows a user to draw a path and then add text that follows the curvature of the path. Such a feature might be useful when adding a name to a road on a map, for example. In a similar context, a user may wish to create directional content, such as a visual depiction of driving directions from a starting point to a destination using arrow symbols. Presently, users are relegated to inserting the individual symbols and manually positioning and orienting them as desired.

Such manipulations may take the user out of a creative flow and may have other drawbacks from a more technical perspective. For instance, a user is presently required to shift between an inking mode in one moment to an editing mode in another, in order to be able to drop visual objects onto a canvas. The objects must then be tediously adjusted so that the desired directional effect is achieved, all of which consumes finite processing resources, to say nothing of the user's time and attention.

Overview

Technology is disclosed herein that allows end users to draw with directional effects in a digital inking environment. In an implementation, an input stroke is received on a canvas in a user interface to an application. The application identifies at least a directional effect with which to render each of a set of discontinuous objects along a continuous path taken by the input stroke on the canvas. The application then renders the set of discontinuous objects on the canvas along the continuous path with at least the directional effect identified for each discontinuous object. Such a feature may sometimes be referred to informally as directional stamping.

The foregoing Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Technology is disclosed herein that supports directional effects for stamping in a digital inking environment. In an implementation, a user may supply an input stroke, such as by tracing a continuous path on a canvas using a stylus, mouse, touch gesture, or other suitable input. As the input stroke proceeds, a directional effect is identified at various points along the path and a discontinuous set of objects is rendered with the effect that was identified for each of the objects. The visual effect is for the objects to be stamped out on the canvas in such a way that they follow the path drawn by the user.

In a brief example, a user may trace a winding path, in response to which a set of arrow-shaped stamps are displayed on the canvas with their orientation such that the arrows appear to follow the path. More generally, one or more characteristics of the path may be identified while the input stroke proceeds and the directional effect determined therefrom. Examples of path characteristics that may be considered when determining a directional effect include, but are not limited to, direction, velocity, and pressure. Examples of directional effects include orientation, spacing, and size of the objects.

A continuous path may be one that begins with an instrument-down action on a canvas and touches the canvas continuously during an input stroke until an instrument-up action occurs. Even then, the path may be considered continuous if the input stroke is broken up merely by a brief instrument-up period. For instance, an instrument-up action may occur for less than a threshold period of time, followed by an instrument-down action on the canvas at or nearby the point of the instrument-up action. Assuming the input stroke proceeds, then path traces by the multiple input strokes may be considered continuous.

A discontinuous set of objects may be a group of objects that can each be individually selected, manipulated, or otherwise interacted with. For example, a path may be stamped out in arrow shapes, where each arrow shape is an individual image. In another example, a path may be stamped out in footprint shapes, where each footprint shape is an individual image. Thus, the user may re-orient, resize, move, delete, or otherwise modify any one of the objects in a discontinuous set after they have been laid down on a canvas.

A technical effect that may be appreciated from the present discussion is the increased ease with which a user may create stamps on a canvas with directional effects. Rather than having to position objects individually so as to give the effect of following a particular path or direction, the user may simply trace a path along the canvas. As the path is traced, the set of discontinuous objects appear with a given directional effect related to the input stroke that traces the path. In some implementations, the accuracy of the directional effects allows the user to stay focused on a task.

In addition, the automated nature of the feature may conserve processing resources as few mistakes occur and less manipulation is needed with respect to the individual objects.

Figure 1A:
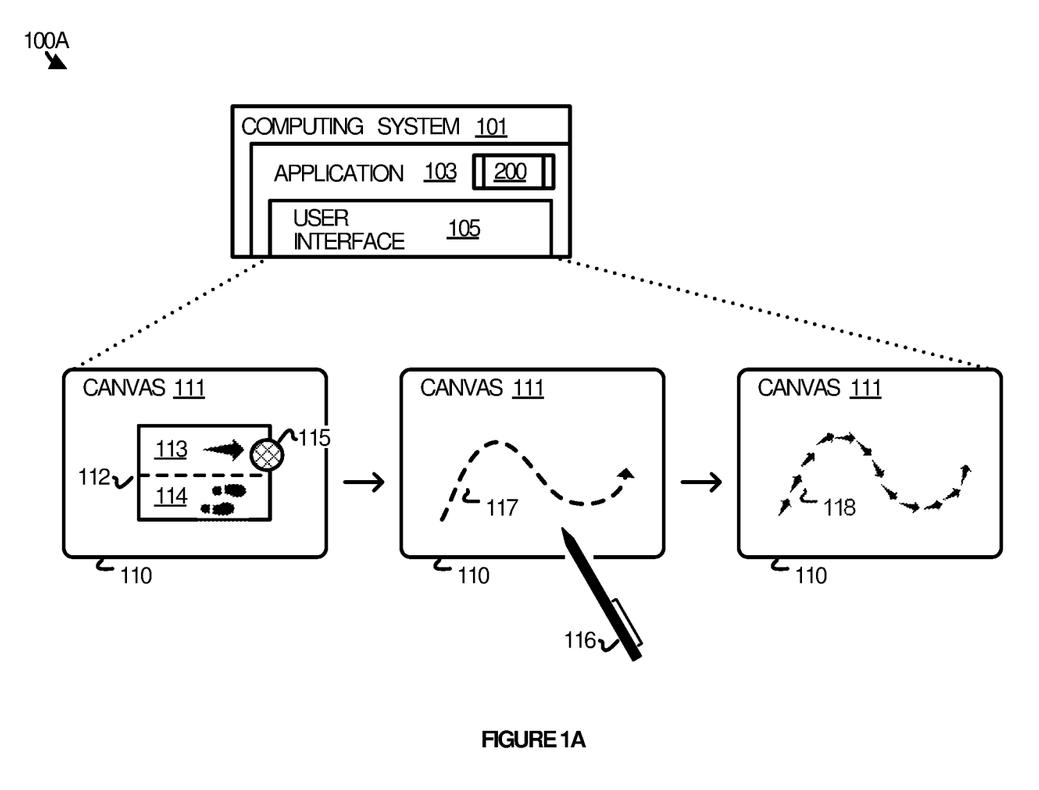
FIGS. 1A-1B illustrate a computing system and related operational scenarios in an implementation of directional stamps.
Figure 1B:
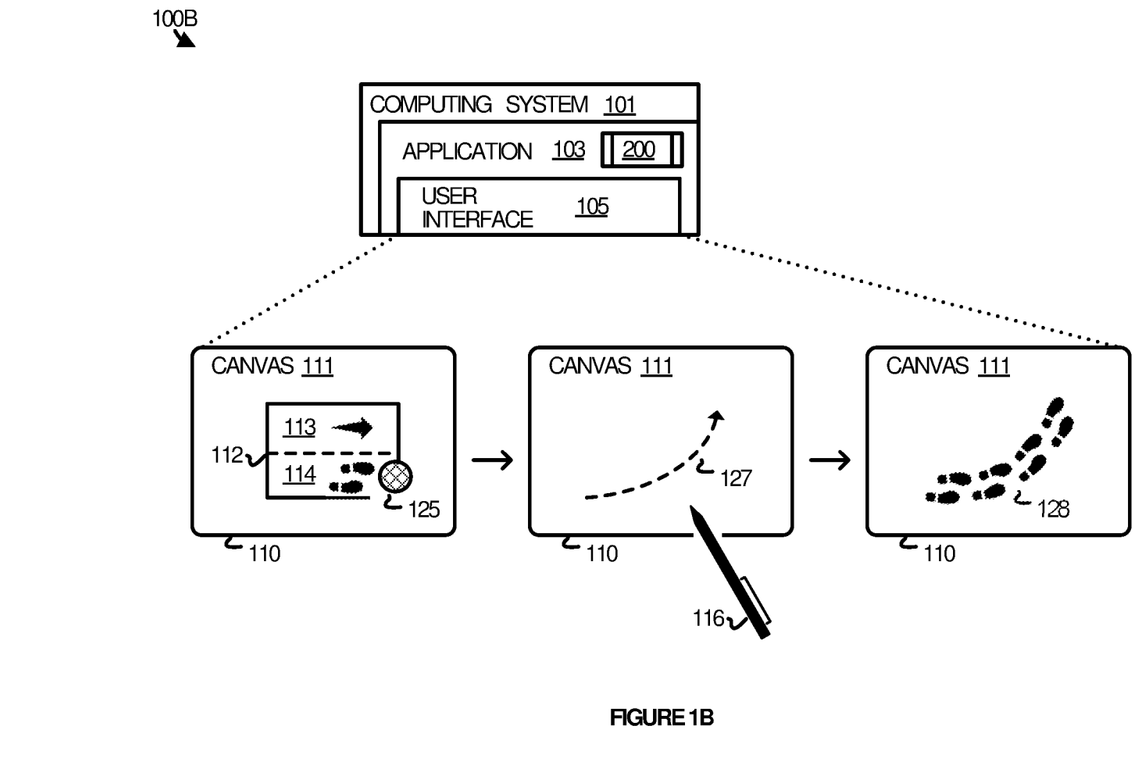

FIG. 1A and FIG. 1B illustrates computing system 101 and various operational scenarios in an implementation of directional effects for digital stamping. Computing system 101 includes application 103, which employs a stamping process 200 in the context of producing views in a user interface 105. View 110 is representative a view that may be produced by application 103 in user interface 105.

Figure 9:
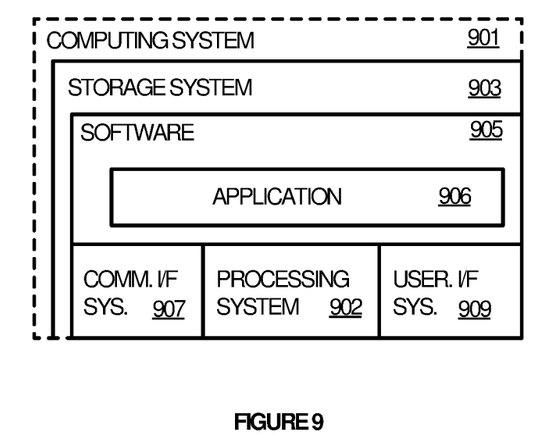
FIG. 9 illustrates a computing system suitable for implementing the software technology disclosed herein, including any of the applications, architectures, elements, processes, and operational scenarios and sequences illustrated in the Figures and discussed below in the Technical Disclosure.

Computing system 101 is representative of any device capable of running an application natively or in the context of a web browser, streaming an application, or executing an application in any other manner. Examples of computing system 101 include, but are not limited to, personal computers, mobile phones, tablet computers, desktop computers, laptop computers, wearable computing devices, or any other form factor, including any combination or variations thereof. Computing system 101 may include various hardware and software elements in a supporting architecture suitable for providing application 103. One such representative architecture is illustrated in FIG. 9 with respect to computing system 901.

Application 103 is representative of any software application or application component capable of supporting directional effects in accordance with the processes described herein. Examples of application 103 include, but are not limited to, presentation applications, diagramming applications, computer-aided design applications, productivity applications (e.g. word processors or spreadsheet applications), and any other type of combination or variation thereof. Application 103 may be implemented as a natively installed and executed application, a web application hosted in the context of a browser, a streaming application, a mobile application, or any variation or combination thereof.

View 110 is representative of a view that may be produced by a presentation application. View 110 includes a canvas 111 on which a user may utilize a stylus to draw lines, shapes, or objects, or supply hand-written words, for example. Stylus 116 is representative of one input instrument, although other instruments are possible, such as mouse devices and touch gestures, or any other suitable input device.

An end user may interact with application 103 to produce maps, directions, flow charts, diagrams, basic layout drawings, or any other type of presentation on canvas 111. The user may draw free-form lines, write text, or otherwise create objects on canvas in furtherance of a given presentation, slide show, document, diagram, or other such content.

In an enhancement, application 103 provides the ability to supply directional effects with respect to digital inking input, which may be appreciated from the following discussion of operational scenario 100A and operational scenario 100B.

In operational scenario 100A, application 103 renders a stamp menu 112, in view 110. Stamp menu 112 offers various stamp styles, represented by an arrow style 113, and a foot print style 114. The user may select one of the styles, which becomes the style of the discontinuous set of objects produced as an input stroke traverses canvas 111.

Input stroke 117 is representative of an input stroke drawn by a user with stylus 116. In this scenario, a selection 115 of arrow style 113 has been made. Accordingly, as input stroke 117 travels from left to right, a discontinuous set of objects 118 in the arrow style are displayed on canvas 111. In addition, each object is automatically oriented such that the entire set gives the visual effect of following the path drawn by the user.

In operational scenario 100A, it is assumed for exemplary purposes that a selection 125 of foot print style 114 has been made. Accordingly, as input stroke 127 travels from left to right, a discontinuous set of objects 128 in the foot print style are displayed on canvas 111. In addition, each object is automatically oriented such that the entire set gives the visual effect of following the path drawn by the user.

Figure 2:
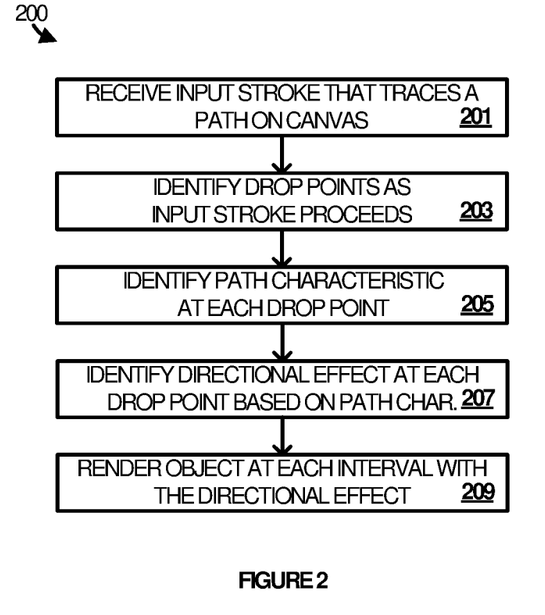
FIG. 2 illustrates a stamping process in an implementation.

FIG. 2 illustrates stamping process 200 which, as mentioned, may be employed by application 103 to render a set of discontinuous objects that follow a path taken by an input stroke on a canvas. Some or all of the steps of stamping process 200 may be implemented in program instructions in the context of a component or components of the application used to carry out the directional effects feature. The program instructions direct application 103 to operate as follows, referring parenthetically to the steps in FIG. 2.

In operation, application 103 receives an input stroke that traces a path on the canvas (step 201). The input stroke may be drawn with a stylus device, a mouse, a touch gesture, or the like. In general, no ink is laid down or otherwise displayed on the canvas. Rather, a discontinuous set of objects are rendered on the canvas along the path and with a specific directional effect for each.

In particular, application 103 identifies potential drop points as the input stroke proceeds along the canvas (step 203). The drop points may be identified at various time intervals, distance internals, or some other measurable interval. The drop points may generally represent points along the path where one or more objects of the set of discontinuous objects may be rendered.

One or more characteristics of the path are identified by application 103 at each of the drop points that were identified along the path (step 205). Characteristics of the path may include, for example, the direction of the path, the velocity at which the path is being drawn, any acceleration or deceleration of the input, or a pressure of the input.

Next, application 103 identifies a directional effect with which to render an object at each of the drop points on the path (step 207). The directional effect is identified based on one or more of the path characteristics discussed above. Examples of directional effects include, but are not limited to, the orientation, size, or color of an object.

Having identified one or more directional effects at a given drop point, application 103 renders an object at the drop point with the directional effects(s) (step 209). For example, an object may be rendered with a particular orientation, size, or color. In the aggregate, a set of objects each formatted with particular directional effects gives the visual effect of the objects following the path, without the user having to place the objects individually and manipulate them manually.

Figure 3A:
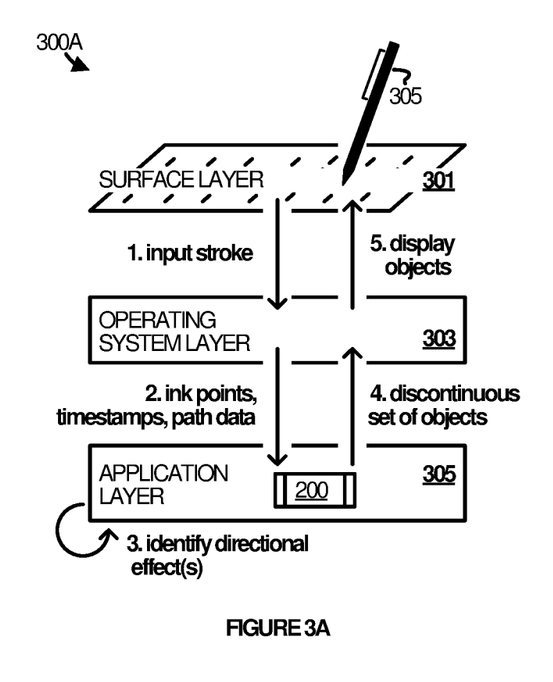
FIGS. 3A-3B illustrate an operational architecture and a related operational scenario in an implementation.
Figure 3B:
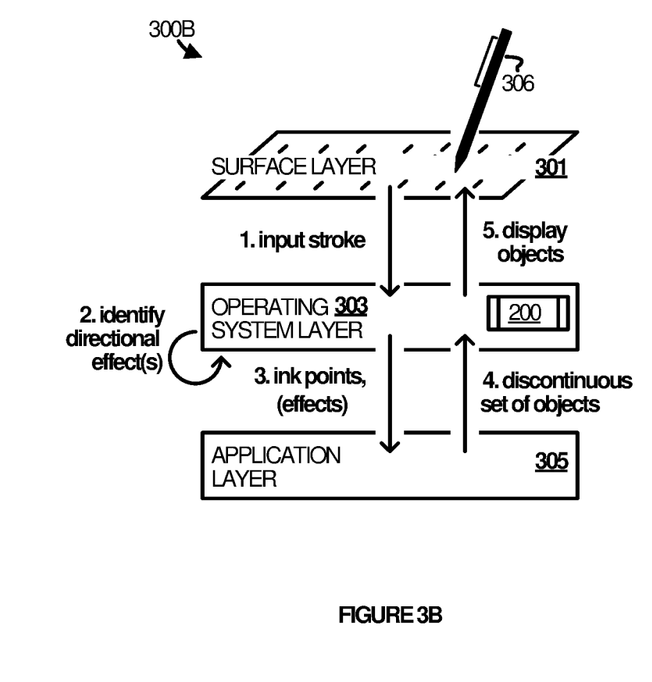

FIG. 3A and FIG. 3B both illustrate an operational architecture that may be present in some implementations of directional effects for digital inking. FIG. 3A and FIG. 3B also illustrate operational scenario 300A and operational scenario 300B respectively, to demonstrate various aspects of the architecture.

The operational architecture includes a surface layer 301, an operating system layer 303, and an application layer 305. Surface layer 301 is representative of any hardware or software elements that function to receive drawing input from an input instrument. Stylus 306 is representative of one such instrument. Surface layer 301 also displays objects.

Operating system layer 303 is representative of the various software elements that receive input information from surface layer 301 in relation to the drawing input supplied by stylus 306. Operating system layer 303 may also handle some aspects of object rendering.

Application layer 305 is representative of a collection of software elements that receive input information from operating system layer 303. Application layer 305 may also provide output information to operating system layer 303.

In operational scenario 300A, application layer 305 employs stamping process 200 illustrated with respect to FIG. 2. To begin, an input stroke is supplied by stylus 306 and is received by surface layer 301. The input stroke is communicated in some format to operating system layer 303. Operating system layer 303 informs application layer 305 about the input stroke in terms of ink points, timestamps, and possibly other path data.

Application layer 305, employing stamping process 200 or a similar process, identifies directional effects to apply to objects laid down along a path traced by the stylus input. Application layer 305 assembles the discontinuous set of objects with the directional effects and provides them to operating system layer 303. Operating system layer 303 interfaces with surface layer 301 to display the objects and their visual effects.

In operational scenario 300B, stamping process 200 is employed by operating system layer 303. An input stroke is supplied by stylus 306 and is again received by surface layer 301. Operating system layer 303 identifies the directional effects to associated with a given drop point and informs application layer 305 of the ink points and directional effects.

Application layer 305 receives the ink points and effects information and responsively selects the set of discontinuous objects to render on the canvas. The objects are formatted in accordance with the directional effects and provided to operating system layer 303. Operating system layer 303 then communicates with surface layer 301 so that the objects may be rendered with their respective directional effects.

Figure 4A:
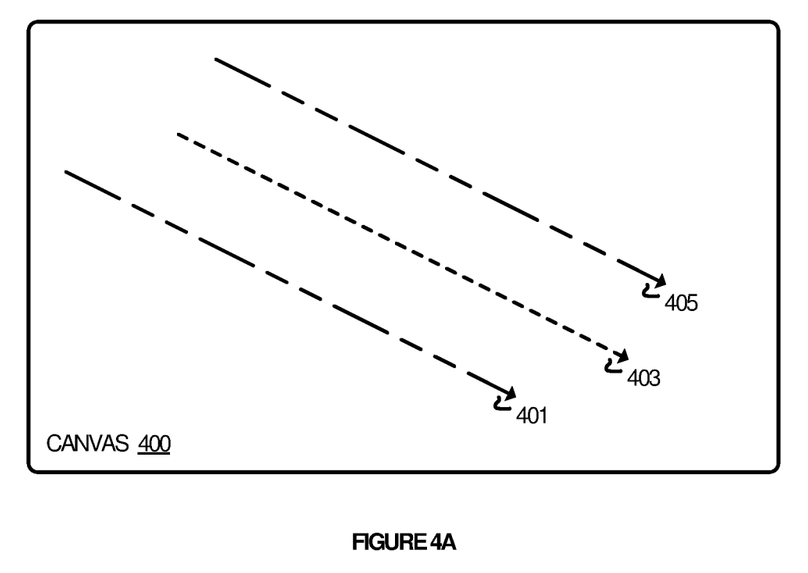
FIGS. 4A-4B illustrate an operational scenario in an implementation.
Figure 4B:
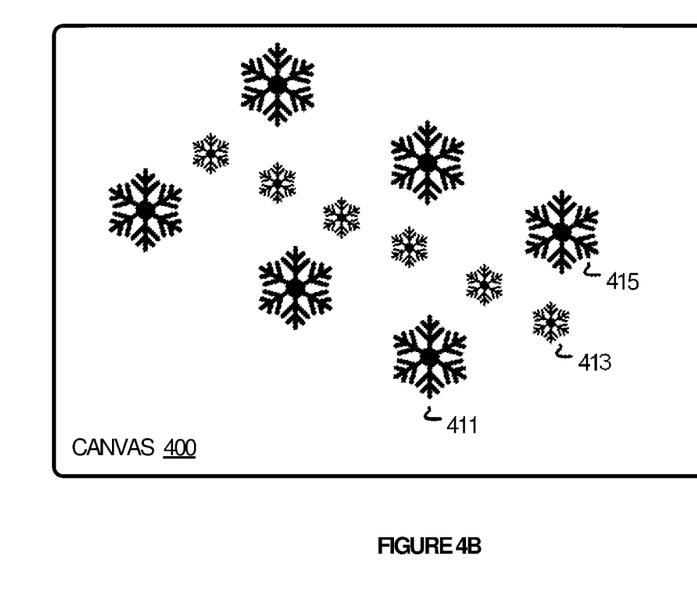

FIGS. 4A-4B illustrate a brief example of directional effects. In operation, a user supplies three different input strokes on canvas 400, represented by input stroke 401, input stroke 403, and input stroke 405.

The dashed lines of the input strokes represent the velocity of each stroke, although other characteristics may be possible. Each stroke is processed as it travels across canvas 400 and a discontinuous set of objects is laid down in its place.

For example, input stroke 401 results in a set of objects 411, input stroke 403 results in another set of objects 413, and input stroke 405 results in another set of objects 415. It may be appreciated that that the snowflakes associated with input stroke 401 are the same size as those associated with input stroke 405. This is because the velocity of input stroke 401 is the same as or similar to input stroke 405.

In contrast, the snowflakes associated with input stroke 403 are smaller than the others. This is because the velocity of input stroke 403 differs relative to that of input stroke 401 and input stroke 405. Input stroke 403 may represent a relatively fast input stroke, for example, which may translate into smaller objects. In other words, the speed of an input stroke may govern the size of each object in a set of discontinuous objects.

Figure 5:
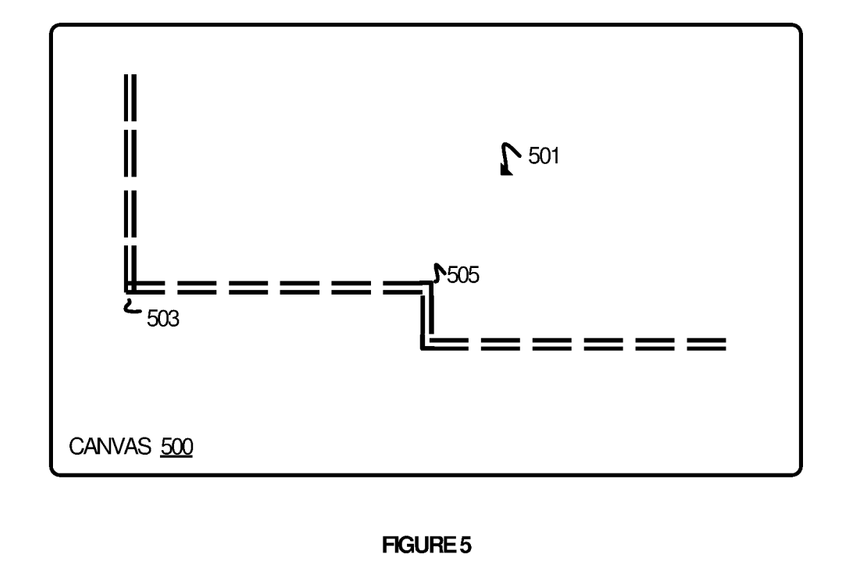
FIG. 5 illustrates an operational scenario in an implementation.

FIG. 5 illustrates a variation of directional effects that may be referred to as special-case stamps. In FIG. 5, an input stroke (not shown) was traced on canvas 500. The input stroke results in a set of stamps 501. Each stamp is a double-lined dash. Not only is a double-lined dash used for each stamp, but a given stamp may be programmatically changed based on a characteristic of the input stroke at a given drop point.

As an example, stamp 503 was changed to bend a right-angle and also to include overlapping lines in the bottom left corner. In a similar way, stamp 505 also bends at a right angle as it turns a corner. However, stamp 505 lacks overlapping lines. Both stamps represent how a pattern may be changed dynamically.

Figure 6:
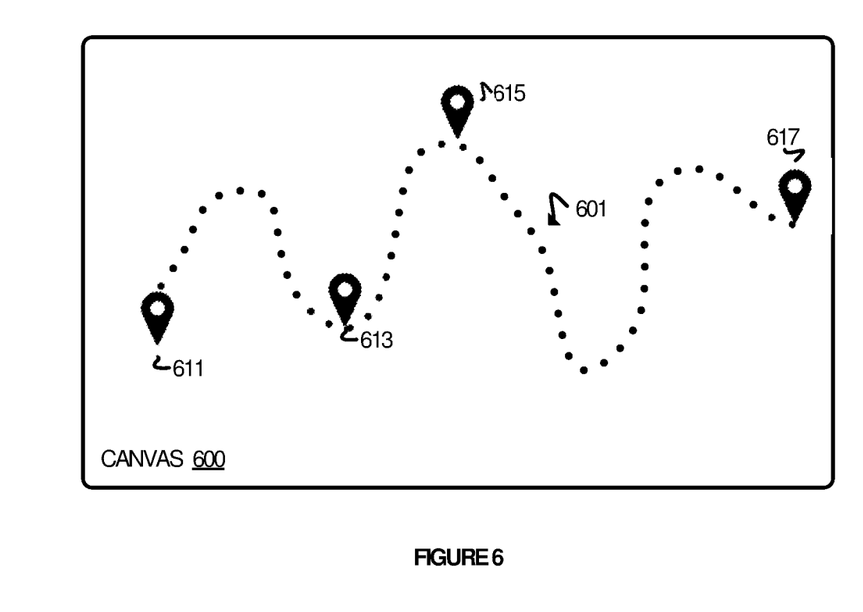
FIG. 6 illustrates an operational scenario in an implementation.

In FIG. 6, an example is provided where end points and stop points along a path created by an input stroke trigger various directional effects. In FIG. 6, an input path has been traced on canvas 600. The input stroke resulted in a line 601 being drawn on canvas 600, but also a discontinuous set of pin points 611, 613, 615, and 617.

The pin points correspond to start points, end points, and points in between on line 601 where the use slowed down or paused the drawing motion. Velocity was used as an input characteristic and a pin point stamp was laid down on canvas 600 where the velocity of the input stroke was zero or near-zero.

Figure 7:
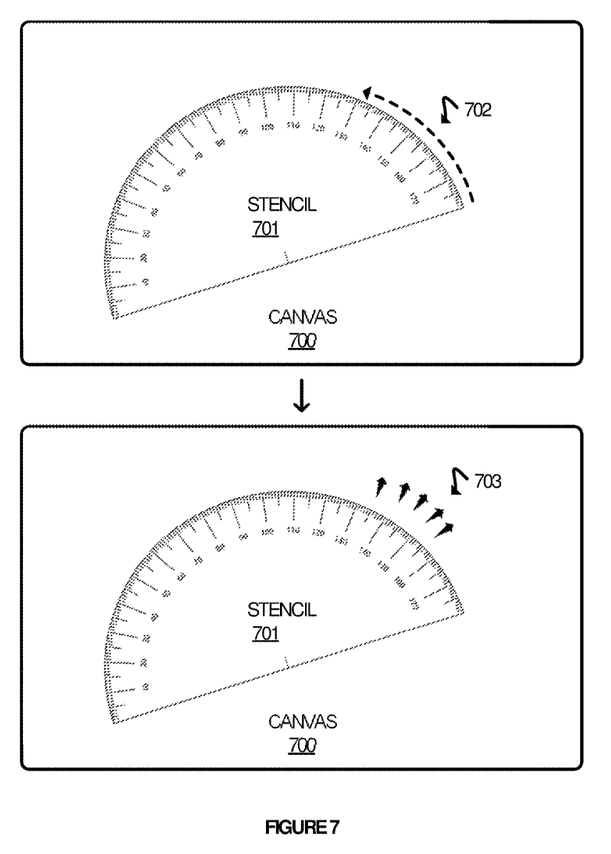
FIG. 7 illustrates an operational scenario in an implementation.

In FIG. 7, a digital stencil 701 has been placed on canvas 700, against which a user may draw lines, shapes, or the like. Utilizing the directional effects feature described herein, the user may draw an input stroke 702 against the curved edge of stencil 701. A set of stamps 703 are rendered on canvas 700 as the input stroke proceeds. However, rather than being oriented to follow the direction of the input stroke, each stamp is oriented to point outward from the center of the digital stencil 701.

This may occur by, for example, analyzing the direction of input stroke 702 at various drop points. Each object is oriented perpendicular to the direction of input stroke 702 at a given drop point. In some examples, the tangent of input stroke 702 may be calculated and used as the basis for a directional effect. Each arrow shape may be oriented perpendicular to the tangent at a given drop point, for instance.

In general, it may be understood that the orientation of any given object need not be the same as the direction of an input stroke at a given point. Rather, the direction of the input stroke serves as a basis for determining an object's orientation. In some instances, the orientation may be the same as the direction. However, in other instances—such as the example immediately above—the orientation may be perpendicular to the direction. In still other scenarios, the orientation may be at a different angle relative to the direction.

Figure 8:
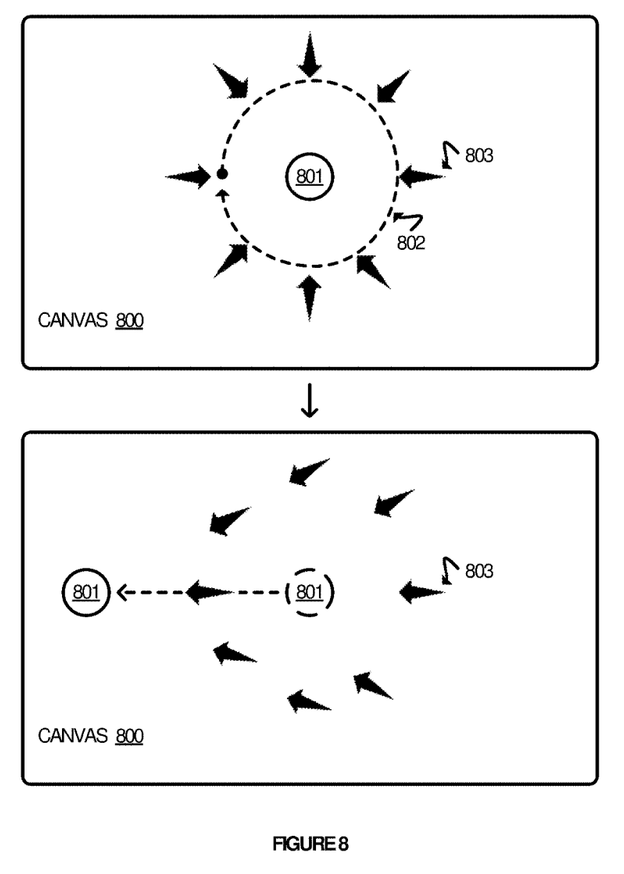
FIG. 8 illustrates an operational scenario in an implementation.

In FIG. 8, the set of stamps 803 are all oriented inward, toward an anchor 801. In this implementation, a user may place the anchor 801 anywhere on canvas 800 and then provide an input stroke 802 somewhere else on the canvas 800. The resulting set of stamps will be oriented to point towards the anchor 801.

In this example, the input stroke 802 is a circle drawn around the anchor 801. Accordingly, the arrow shapes are orientated inward towards the anchor 801. The user may optionally move the anchor 801 to a different location on the canvas 800. Moving the anchor 801 may trigger a re-orientation of the set of stamps 803. Each of the arrow shapes is re-oriented to point towards the new location of the anchor 801.

FIG. 9 illustrates computing system 901, which is representative of any system or collection of systems in which the various applications, architectures, services, scenarios, and processes disclosed herein may be implemented. Examples of computing system 901 include, but are not limited to, desktop computers, laptop computers, tablet computers, computers having hybrid form-factors, mobile phones, smart televisions, wearable devices, server computers, blade servers, rack servers, and any other type of computing system (or collection thereof) suitable for carrying out the directional effects operations described herein. Such systems may employ one or more virtual machines, containers, or any other type of virtual computing resource in the context of directional effects and digital inking.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes application 906 which is representative of the software applications discussed with respect to the preceding FIGS. 1-8, including application 103. When executed by processing system 902 to support directional effects in a user interface, application 906 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 in general, and application 906 in particular, may be implemented in program instructions and among other functions may, when executed by processing system 902, direct processing system 902 to operate as described with respect to the various operational scenarios, sequences, and processes illustrated herein. For example, application 906 may include program instructions for implementing a directional effects process, such as stamping process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtual machine software, or other application software, in addition to or that include application 906. Software 905 may also comprise firmware or some other form of machine-readable processing instructions executable by processing system 902.

In general, application 906 may, when loaded into processing system 902 and executed, transform a suitable apparatus, system, or device (of which computing system 901 is representative) overall from a general-purpose computing system into a special-purpose computing system customized to perform directional effects operations. Indeed, encoding application 906 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, application 906 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 may include a keyboard, a stylus (digital pen), a mouse, a voice input device, a touch input device for receiving a touch gesture from a user, a motion input device for detecting non-touch gestures and other motions by a user, and other comparable input devices and associated processing elements capable of receiving and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface, in which a user interface to an application may be presented (e.g. user interface 105).

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A computing apparatus comprising:
one or more computer readable storage devices;
a processing system operatively coupled with the one or more computer readable storage devices; and
program instructions stored on the one or more computer readable storage devices that, when executed by the processing system, direct the processing system to at least:
receive an input stroke on a canvas in a user interface to an application;
identify at least a directional effect with which to render each of a set of discontinuous objects along a continuous path taken by the input stroke on the canvas; and
render the set of discontinuous objects on the canvas along the continuous path with at least the directional effect identified for each discontinuous object;
wherein each object of the set of discontinuous objects comprises an individually selectable and manipulatable object.

2. The computing apparatus of claim 1 wherein to identify the directional effect, the program instructions direct the processing system to identify the directional effect with which to render each of the set of discontinuous objects based on at least one of a plurality of characteristics of the input stroke.

3. The computing apparatus of claim 2 wherein to identify the directional effect, the program instructions direct the processing system to identify a plurality of directional effects with which to render each of the set of discontinuous objects.

4. The computing apparatus of claim 3 wherein the plurality of characteristics of the input stroke comprises direction and velocity.

5. The computing apparatus of claim 4 wherein the plurality of directional effects with which to render each of the set of discontinuous objects comprises orientation and size.

6. The computing apparatus of claim 5 wherein the plurality of characteristics of the input stroke further comprises a proximity of the input stroke to a stencil.

7. The computing apparatus of claim 1 wherein each object of the set of discontinuous objects is an individual image.

8. The computing apparatus of claim 1 wherein a stylus operated by a user supplies the input stroke and wherein no line is rendered during the input stroke.

9. A method of operating an application in support of directional effects for objects in a digital inking environment, the method comprising:
receiving an input stroke on a canvas in a user interface to an application;
identifying at least a directional effect with which to render each of a set of discontinuous objects along a continuous path taken by the input stroke on the canvas; and
rendering the set of discontinuous objects on the canvas along the continuous path with at least the directional effect identified for each discontinuous object;
wherein each object of the set of discontinuous objects comprises an individually selectable and manipulatable object.

10. The method of claim 9 wherein identifying the directional effect comprises identifying the directional effect with which to render each of the set of discontinuous objects based on at least one of a plurality of characteristics of the input stroke.

11. The method of claim 10 wherein identifying the directional effect comprises identifying a plurality of directional effects with which to render each of the set of discontinuous objects.

12. The method of claim 11 wherein the plurality of characteristics of the input stroke comprises direction and velocity.

13. The method of claim 12 wherein the plurality of directional effects with which to render each of the set of discontinuous objects comprises orientation and size.

14. The method of claim 13 wherein the plurality of characteristics of the input stroke further comprises a proximity of the input stroke to a stencil.

15. The method of claim 9 wherein each object of the set of discontinuous objects is an individual image.

16. The method of claim 9 wherein a stylus operated by a user supplies the input stroke and wherein no line is rendered during the input stroke.

17. One or more computer readable storage devices having program instructions stored thereon for supporting directional effects in a digital inking environment that, when executed by the processing system, direct the processing system to at least:
   receive an input stroke on a canvas in a user interface to an application;
   identify at least a directional effect with which to render each of a set of discontinuous objects along a continuous path taken by the input stroke on the canvas; and
   render the set of discontinuous objects on the canvas along the continuous path with at least the directional effect identified for each discontinuous object;
   wherein each object of the set of discontinuous objects comprises an individually selectable and manipulatable object.

18. The one or more computer readable storage devices of claim 17 wherein to identify the directional effect, the program instructions direct the processing system to at least identify the directional effect with which to render each of the set of discontinuous objects based on at least one of a plurality of characteristics of the input stroke, wherein the plurality of characteristics of the input stroke comprises direction and velocity and wherein the directional effect with which to render each of the set of discontinuous objects comprises at least one of orientation and size.

19. The one or more computer readable storage devices of claim 17 wherein each object of the set of discontinuous objects is an individual image.

20. The one or more computer readable storage devices of claim 17 wherein a stylus operated by a user supplies the input stroke and wherein no line is rendered during the input stroke.

* * * * *